United States Patent [19]

Hafner et al.

[11] Patent Number: 4,582,085

[45] Date of Patent: Apr. 15, 1986

[54] ELECTROMAGNETICALLY ACTUATABLE VALVE

[75] Inventors: Udo Hafner, Lorch; Rüdolf Kraüss, Stuttgart, both of Fed. Rep. of Germany

[73] Assignee: Robert Bosch GmbH, Stuttgart, Fed. Rep. of Germany

[21] Appl. No.: 565,063

[22] Filed: Dec. 23, 1983

[30] Foreign Application Priority Data

Feb. 14, 1983 [DE] Fed. Rep. of Germany ....... 3305039

[51] Int. Cl.4 ...................... F16K 31/06; F16K 25/04; F02M 51/06

[52] U.S. Cl. .................................... 137/544; 137/546; 239/585; 251/129.14; 251/129.16; 251/129.17; 251/129.21

[58] Field of Search ........... 251/141, 139, 129, 129.16, 251/129.14, 129.17, 129.21; 137/546, 544; 239/585

[56] References Cited

U.S. PATENT DOCUMENTS

| | | | |
|---|---|---|---|
| 3,960,361 | 6/1976 | York | 251/141 |
| 4,365,747 | 12/1982 | Knapp et al. | 251/139 X |
| 4,390,130 | 6/1983 | Linssen et al. | 251/139 X |
| 4,471,914 | 9/1984 | Hafner et al. | 239/585 |
| 4,474,332 | 10/1984 | Kaska | 251/141 X |

FOREIGN PATENT DOCUMENTS

| | | | |
|---|---|---|---|
| 615997 | 1/1949 | United Kingdom | 251/139 |

*Primary Examiner*—Arnold Rosenthal
*Attorney, Agent, or Firm*—Edwin E. Greigg

[57] ABSTRACT

An electromagnetically actuatable valve which serves to control a flow of fluid. The valve includes a valve housing and a core of ferromagnetic material as well as an armature, which actuates a valve element cooperating with a fixed valve seat. When a magnetic coil is excited, the armature is attracted toward a stop face on the end face of the valve housing. The stop face is defined on one side by an inner bore of the valve housing and on the other by the rim of a groove which is embodied in the end face. The circumference of the armature partially overlaps the groove.

3 Claims, 4 Drawing Figures

ELECTROMAGNETICALLY ACTUATABLE VALVE

BACKGROUND OF THE INVENTION

The invention is based on an electromagnetically actuatable valve for fuel injection systems of internal combustion engines. An electromagnetically actuatable valve is already known in which dirt particles become deposited in the outer periphery of the stop face of the armature and are carried along with the fuel medium. Such deposits can cause undesirable changes in the characteristic curve of the valve as a result of changes in the armature stroke and/or seizing effects.

OBJECT AND SUMMARY OF THE INVENTION

An electromagnetically actuatable valve according to the invention has the advantage over the prior art that deposits on the stop face are avoided, because dirt particles are intercepted by flow barriers outside the stop face. A further advantage is that the stop face can be defined more precisely.

It can also be advantageous to provide at least one further groove in the stop face, which is capable of catching dirt particles that reach the area of the stop face.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
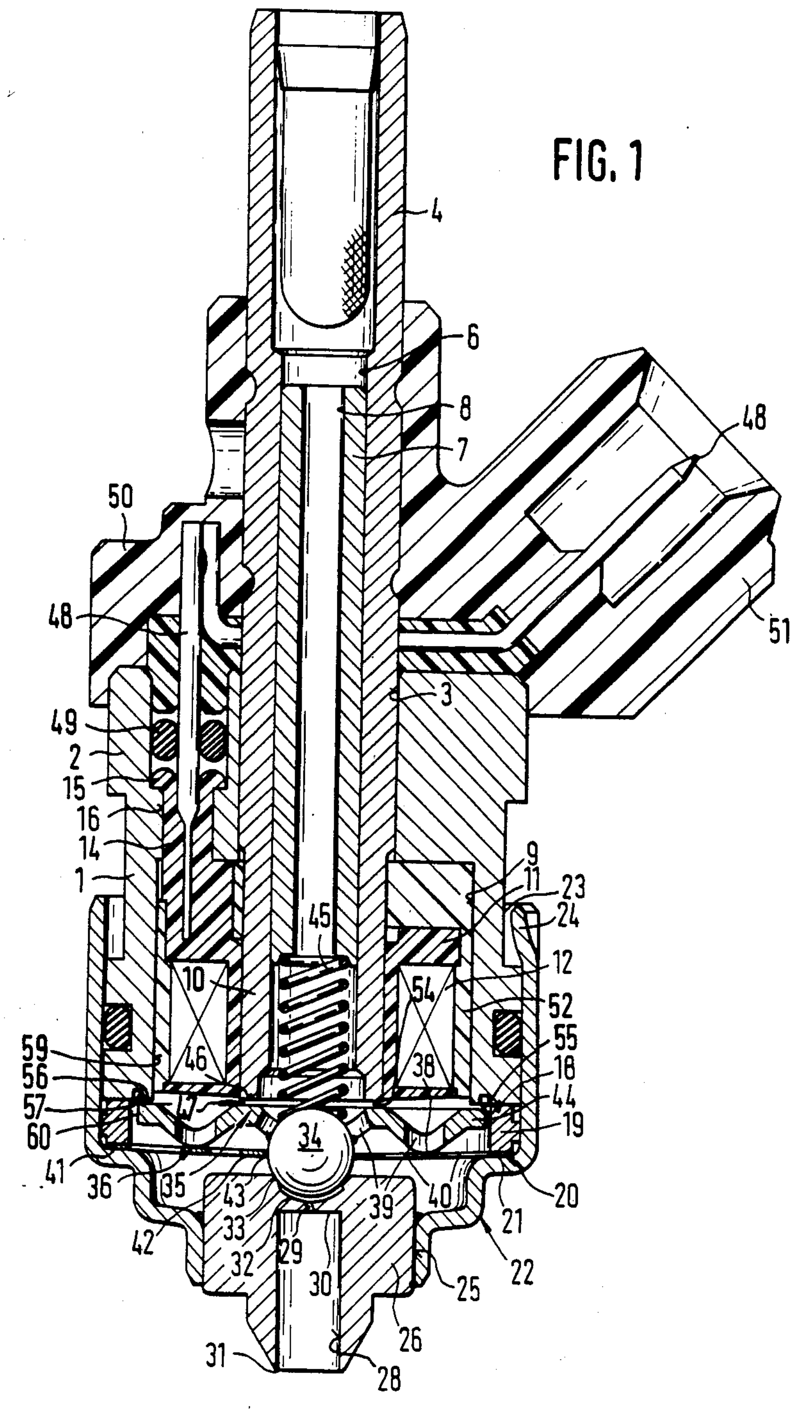
FIG. 1 shows an embodiment of a fuel injection valve in accordance with the invention.

The fuel injection valve for a fuel injection system is shown in FIG. 1 as an example of a valve that is intended for instance for the injection of fuel into the intake tube of fuel mixture-compressing internal combustion engines with externally supplied ignition. Reference numeral 1 indicates a valve housing which is manufactured by a chipless shaping process such as deep drawing, rolling or the like. The housing has a generally cup-shaped configuration with a bottom 2. A fuel fitting 4 that serves as a connector fitting is inserted sealingly into a holder bore 3 of the bottom 2. This fuel fitting 4 is comprised of ferromagnetic material and simultaneously serves as the inner core of the electromagnetically actuated valve. The fuel fitting 4 extends coaxially with the axis of the valve and has an inner bore 6, into which an adjusting sheath 7 having a flowthrough bore 8 is pressed. One end of the fuel fitting 4 protrudes out of the valve housing 1 and communicates with a fuel source, such as a fuel distributor line. The other end 10 of the fuel fitting 4 serving as the inner core protrudes into an interior chamber 9 of the valve housing 1 and carries an insulating carrier body 11, which at least partially encompasses a magnetic coil 12. The carrier body 11 and the magnetic coil 12 are axially fixed in a fastening bore 16 of the bottom 2 by means of bead or snap-in means 15 via at least one guide pin 14. A spacer ring 19 which is adjoined by a guide diaphragm 20 rests on the end face 18 of the valve housing 1 remote from the bottom 2. The other side of the guide diaphragm 20 is engaged by a shoulder 21 of a nozzle carrier 22, which partially encompasses the valve housing 1 and is flanged with its end 24 into a holder groove 23 of the valve housing 1, thereby exerting an axial tensioning force for the positional fixation of the spacer ring 19 and the guide diaphragm 20. Remote from the valve housing 1, the nozzle carrier 22 has a coaxial receiving bore 25, in which a nozzle body 26 is inserted and is secured, for example, by welding or soldering. The nozzle body 26 has a preparation bore 28 having the general shape of a blind bore with a bottom 30 having at least one fuel passage 29 serving to supply the metered amount of fuel. The fuel passage 29 preferably discharges in such a manner at the bore bottom 30 of the preparation bore 28 that the flow into the preparation bore 28 does not take place in a tangential direction. Instead, the fuel stream emerges from the fuel passages 29 without initially contacting the walls of the preparation bore. Thereafter the fuel jet impinges against the wall of the preparation bore 28 and spreads out over it in a film, more or less in the form of a parabola, toward the open end 31 and breaks away therefrom. Each fuel passage 29 is disposed at an inclination relative to the valve axis and begins at a spherical chamber 32 embodied in the nozzle body. Downstream of chamber 32 a curved valve seat 33 is embodied in the nozzle body 26, with which valve seat 33 a spherical valve element 34 in the form of a ball cooperates. To attain the smallest possible clearance volume, the volume of the spherical chamber should be as small as possible when the spherical valve element 34 is resting on the valve seat 33.

Remote from the valve seat 33, a spherical valve element 34 is connected to a flattened, plate-like armature 35 of radially-corrugated, cylindrical shape. This connection may be accomplished, for example, by soldering or welding. The armature 35 may be formed as a stamped or molded element and may have for example an annular guide ring 36 in the form of a raised area which presses against an annular guide region 38 of the guide diaphragm 20 on the side of the latter remote from the valve seat 33. Flow-through openings 39 in the flat armature 35 and flow ports 40 in the guide diaphragm 20 allow the fuel to flow unhindered through the armature 35 and the guide diaphragm 20. The guide diaphragm 20 is attached to the casing by compression in a fastening area 41 on its outer circumference between the spacer ring 19 and the shoulder 21. Diaphragm 20 has a centering region 42 surrounding a centering opening 43, through which the movable valve element 34 protrudes and by which it is centered in the radial direction. The fastening of the guide diaphragm firmly to the housing between the spacer ring 19 and the shoulder 21 is effected in a plane which, when the spherical valve element 34 is resting on the valve seat 33, passes through, or as close as possible to, the center point of the spherical valve element. By means of the guide area 38 of the guide diaphragm 29 engaging the guide ring 36 of the flat armature 35, the flat armature 35 is substantially parallelly guided to the end face 18 of the valve housing 1, beyond which it partially protrudes with an outer effective area 44. A compression spring 45 is guided in the inner bore 6 of the end of the fuel fitting 4, the latter extending almost to the armature 35 and serving as the inner core 10 of the electromagnet. One end of the compression spring 45 engages the valve element 34 and the other end engages the adjusting sheath 7. The spring thus is arranged to urge the valve element 34 toward the valve set 33. The fuel fitting 4 serving as the inner core is inserted in the housing 1 to the point that a small air gap 54 exists between its end face 46 oriented toward the flat armature 35 and an inner effective area 47 on the flat armature. When the magnetic coil 12 is excited, the armature 35 comes to rest with its outer effective area 44 on the part of the end face 18 of the valve housing 1 serving as a stop face 56. If the magnetic coil 12 is not excited, the flat armature assumes a position in which an air gap 55 is instead formed between the stop face 56 and the effective area 44. As a result, the flat armature is prevented fiom sticking to the inner core 10. After the desired air gap is preset during assembly of the valve components, the fuel fitting 4 is advantageously soldered or welded to the housing bottom 2. The magnetic circuit extends externally over the valve housing 1 and internally over the fuel fitting 4 and is closed via the flat armature 35.

The supply of electric current to the magnetic coil 12 is effected via contact lugs 48, which are partially embedded in the plastic carrier body 11. The contact lugs protrude out of the housing 1 via the fastening bores 16 in the bottom 2. The contact lugs 48 may, as shown, extend at an angle with respect to the valve axis. For sealing purposes, the contact lugs 48 are partially sheathed by the guide pins 14 of the carrier body 11 and are surrounded in the fastening bore 16 by sealing rings 49. A plastic cap 50 is injection molded around, and at least partially envelops the contact lugs 48 along with the fuel fitting 4 and the bottom 2. In the vicinity of the ends of the contact lugs 48, this plastic cap 50 is shaped as a plug connector 51.

The fuel flowing in via the fuel fitting 4 can be partially metered at the fuel guide bores 29 and ejected via the preparation bore 28, presuming that the magnetic coil 12 has current flowing through it and thus that the flat armature 35 is attracted.

The inner core 10, the carrier body 11 and the magnetic coil 12 do not completely fill the interior chamber 9 of the valve housing 1. It may therefore be appropriate, before the carrier body 11 and magnetic coil 12 are inserted into the interior chamber 9, to coat or cover the carrier body 11 and the magnetic coil 12 with a plastic jacket 52, which in the assembled state fills out the remaining space between the inner core 10, carrier body 11, magnetic coil 12 and inside diameter of the interior chamber 9 of the valve housing 1. The result is the avoidance of a clearance volume in which fluid can stagnate and cause corrosion.

Figure 2:
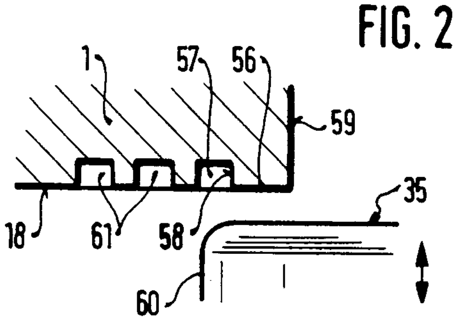
FIGS. 2–4 show further embodiments of the invention in the vicinity of a stop face of an armature, shown in detail and on an enlarged scale as compared with FIG. 1.
Figure 3:
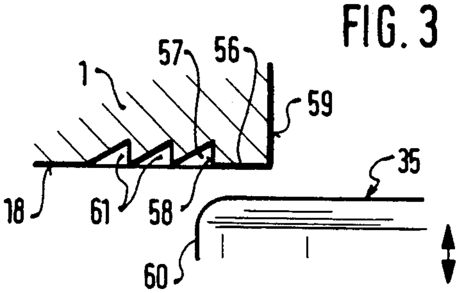
Figure 4:
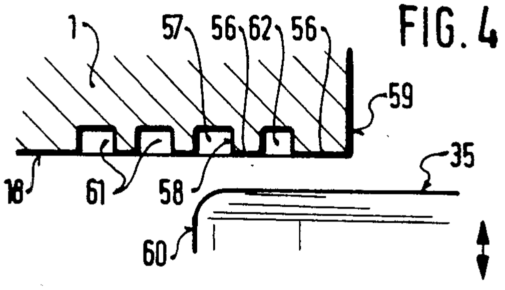

In accordance with the invention, at least one groove 57 is provided in the end face 18 of the valve housing 1, as shown on an enlarged scale in FIGS. 2, 3 and 4. With its rim 58 oriented toward the armature, the groove 57 defines one side of the stop face 56, the other side of which is defined by an inner bore 59 of the valve housing 1. The groove 57 is wide enough that it is partially overlapped by the circumference 60 of the armature 35. In an advantageous manner, at least one further groove 61 is embodied in the end face 18 outside the stop face 56. As shown in FIG. 4, at least one further groove 62 may also be embodied in the stop face 56. The grooves 57, 61 and 62 may have a rectangular or square cross section by way of example, as shown in FIGS. 1, 2 and 4, or a triangular cross section, as shown in FIG. 3. The grooves 57, 61 and 62 have a depth and width of approximately 0.2 to 0.5 mm. If the armature 35 is circular, the grooves 57, 61 and 62 are advantageously annular in course.

Movement of the armature up and down causes fuel to surge back and forth between the armature 35 and the end face 18 of the valve housing 1, resulting in a primary flow direction relative to the valve axis. Dirt deposits then form primarily near the outer radius of the stop face 56. If, as in accordance with the present invention, the end face 18 is provided with grooves 57, 61, 62, the dirt particles are intercepted and deposits in the vicinity of the stop face 56 are avoided.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable fuel injection valve for fuel injection systems of internal combustion engines, comprising a valve housing, an electromagnet, a core of ferromagnetic material extending into an interior bore of said housing and an armature actuating a valve element cooperating with a fixed valve seat, said armature being attracted toward a stop face when a magnetic coil of said electromagnet is excited, said stop face being part of an end face of said valve housing and on the same plane, said end face having at least a first groove positioned relative to said armature such that the circumference of said armature partially overlaps said at least first groove, said stop face being defined by a rim of the overlapped groove juxtaposed a portion of said armature facing said at least first groove.

2. A valve as defined by claim 1, wherein the stop face is provided with a second groove externally of said first groove in said end face.

3. A valve as defined by claim 1 wherein a plurality of grooves are provided in said stop face, said grooves being concentric about the axis of said interior bore.

* * * * *